Oct. 14, 1958   E. J. HAZEN ET AL   2,855,888
PRECISION MECHANICAL CONTROL
Filed Feb. 24, 1955   2 Sheets-Sheet 1
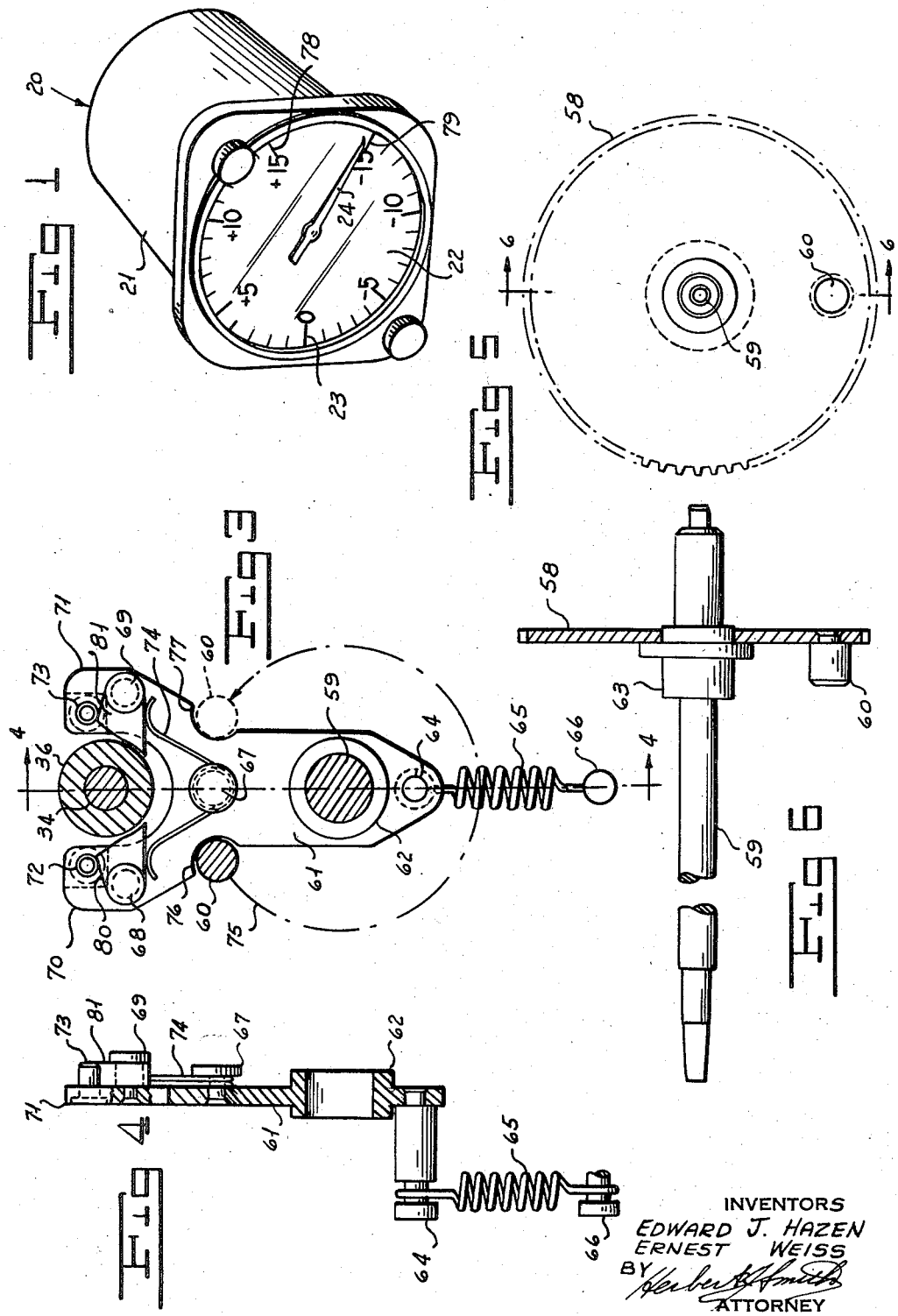
INVENTORS
EDWARD J. HAZEN
ERNEST WEISS
BY Herbert H. Smith
ATTORNEY Oct. 14, 1958  E. J. HAZEN ET AL  2,855,888
PRECISION MECHANICAL CONTROL
Filed Feb. 24, 1955  2 Sheets-Sheet 2
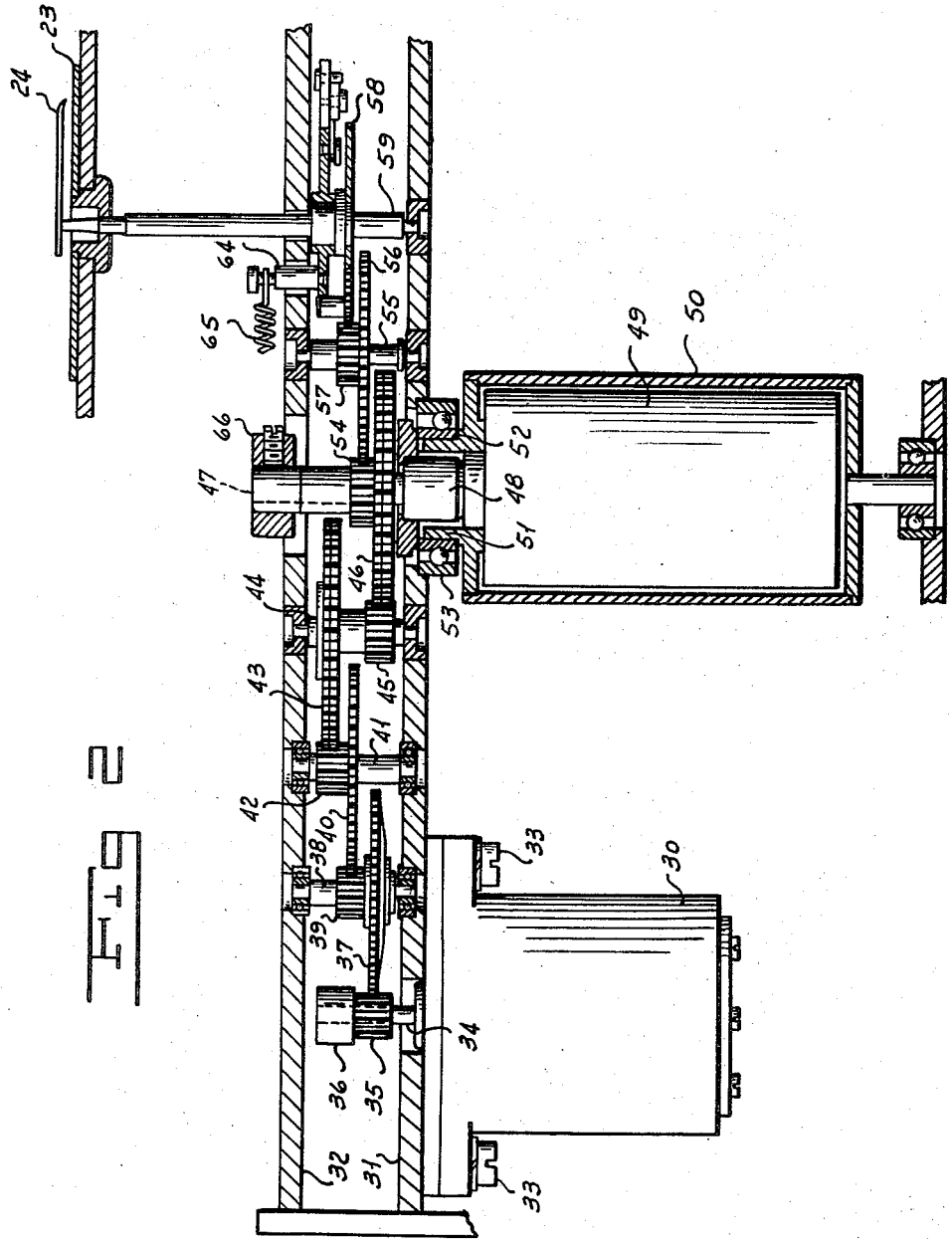
INVENTORS
EDWARD J. HAZEN
ERNEST WEISS
BY
ATTORNEY

United States Patent Office 2,855,888
Patented Oct. 14, 1958.

2,855,888

PRECISION MECHANICAL CONTROL

Edward J. Hazen, Westwood, and Ernest Weiss, Maywood, N. J., assignors to Bendix Aviation Corporation, Teterboro, N. J., a corporation of Delaware Application February 24, 1955, Serial No. 490,393

3 Claims. (Cl. 116—129)

This invention relates to mechanical controls, and more particularly to a precision mechanical control usable on an aircraft, and which may be used in a servo system wherein an actuating means, such as a motor, may drive a gear train to actuate one or more outputs, and wherein a precision braking means is utilized to mechanically stop the motor when one of said output means attains a predetermined angular displacement, regardless of the degree of continued energization of the motor.

It is an object of the present invention to provide a novel mechanical precision control for an actuating means.

A further object of the invention is to provide a servo system with a novel means of stopping an actuating device when an output means attains a predetermined angular displacement.

A further object is to provide a motor driven mechanism coupled to one or more output means having a novel braking arrangement for said mechanism when one of said output means reaches some predetermined displacement.

Another object is the provision of a stopping arrangement of a coupling means by a novel braking mechanism of the driving source for the coupling means when an output provided by said coupling means is displaced to a predetermined position.

Another object is the provision of a motor driven indicator having a pointer readable on a scale with range limits, and wherein a novel means is provided to halt operation of the motor at the range limits regardless of continued energization of the motor.

Another object is to provide a motor driven gear train for actuating a multiplicity of different outputs with a novel means of mechanically stopping the rotation of the motor and motion of all output means when one of said output means attains a predetermined angular displacement, but which novel means is automatically released when the direction of motor rotation is reversed.

The invention contemplates a motor which drives a gear train to rotate a multi-turn control potentiometer output device and an indicator for a composite instrument such as an optimum altitude indicator usable in aircraft. The motor is reversible and is energized to drive the control potentiometer and the instrument pointer. The gear train actuates a brake to mechanically lock the motor at a precise angular displacement of the indicator pointer and automatically releases the motor when its rotational direction is reversed.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and not to be construed as defining the limits of the invention.

In the drawings:

Fig. 1 is a perspective view of an instrument employing the invention.

Fig. 2 is a stretch-out drawing of the invention.

Fig. 3 is a front view of the brake yoke.

Fig. 4 is a sectional view taken along lines 4—4 of Fig. 3.

Fig. 5 is a plan view of the final gear.

Fig. 6 is a sectional view taken along lines 6—6 of Fig. 5.

Referring to the drawings and more particularly to Fig. 1, there is shown an instrument 20, having a casing 21 with a transparent window 22 in front of a scale or dial 23 having graduations thereon and with range limits indicia for the pointer 24, said limits being indicated by the graduations for the +15 and —15 indica on the dial of the optimum altitude indicator.

The drawing of Fig. 2 is in "stretch-out" form to more clearly present the interrelation of the several parts. Actually, the device is encased in a shell, as shown in Fig. 1, wherein the brake yoke has a pair of brake shoes to grip a brake drum on the shaft of the motor. In the stretch-out view, the motor is at the left hand end of the drawing, while the brake yoke or arm is at the right hand end of the drawing.

A motor 30 is mounted and secured by screws 33 on a supporting structure including two plates 31 and 32 which are secured within the casing 21. The motor shaft 34 has a spur gear 35 and a brake drum 36 secured thereon. The brake drum is engageable by the brake shoes to be described later relative to the enlarged views in Figs. 3 to 6.

The gear 37 engages spur gear 35. The shaft 38 also carries a spur gear 39 which engages gear 40 on a shaft 41 which also has a spur gear 42 thereon. The last said spur gear engages gear 43 which is on a shaft 44 which also carries a spur gear 45 in mesh with a gear 46 secured to the shaft 47 which is unitary with the hub 48 and the cylinder 49, which cylinder is revolvable within the housing 50.

The housing 50 has an annular shoulder 51 thereon mounted via the inner race 52 of a bearing assembly also having an outer race 53 secured to the supporting plate 31. By this arrangement the housing 50 may be rotated independently of the cylinder 49, which cylinder is turned independently in response to the gear train and motor operation.

A spur gear 54 secured on the shaft 47 meshes with a gear 56 secured on shaft 55 which also carries a spur gear 57. Spur gear 57 rotates the final gear 58 which is secured on the final gear shaft 59 which also carries the pointer 24 positioned in front of the dial 23.

The enlarged views in Figs. 3 to 6 are of the final gear and final gear shaft, 58 and 59, respectively. The actuating pin 60 is secured on the gear 58 and positioned thereon to engage the brake yoke 61 in either the recess 76 or 77, depending on the direction of rotor motion of the motor.

The brake yoke 61 is mounted, by way of the bushing 62, to have a working fit on the shoulder 63 formed as part of the final shaft 59 so that the shaft 59 may rotate freely without imparting any motion to said brake yoke. A pin 64 is secured on the brake yoke normal with the face thereof, and extends outwardly to receive one end of a tension spring 65, while the other end of the spring is attached to an anchor pin 66 secured on plate 32.

The center line 67 drawn on Fig. 3 passes through the horizontal cross-section centers of the motor shaft rotor 34 and the final shaft 59, which centers are aligned with the axial centers of pins 64 and 66, as well as the center of brake shoe spring pin 67.

Brake shoes, of which there are an identical pair, are pivotably mounted by pins 68 and 69 to the bifurcated leg portions 70 and 71, respectively, of the yoke 61.

Shoe stops 72 and 73 limit the movement of the shoes in an outer direction, while the brake shoe spring 74 makes a complete turn on the pin 67 and terminates in a pair of identical arms having outwardly curved surfaces for very light engagement with the respective brake shoes to hold said shoes with slight pressure against their respective pins 72 and 73.

The brake drum 36 on the motor shaft 34 is normally spaced with a few thousandths of an inch or less equal clearance between each of the brake shoes when the spring 65 holds the yoke 61 properly centrally aligned relative to the motor shaft 34. The brake shoes each have a curved surface or face for engagement with the surface of the brake drum, with said faces being of a curvature similar to that of the brake drum.

The dotted circle 75 is the arc which the actuating pin 60 would make in traveling between the recesses 76 and 77 formed in the sides of the yoke.

The graduations 78 and 79 (Fig. 1) are, respectively, the graduation +15 and −15, shown on the dial 23, and represent the operative range limits of the optimum altitude indicator. The angular disposition of the graduations 78 and 79, relative to the final gear shaft 59, is identical to the angular disposition of the actuating pin 60 at its opposite limits, so that, depending on the direction of rotation of the motor shaft 34, either one or the other of the brake shoes 80—81 will engage the brake drum 36, to stop the motor exactly as the pointer 24 reaches either of said range limit graduations 79 or 78.

The motor has a small torque and its shaft makes many revolutions relative to the final gear, and one of a pair of outputs, which makes less than one revolution but has a high torque, in the present illustration. Another output, or a second output, which is the rotatable cylinder 49, also requires a relatively high torque.

In operation, assuming the direction of the motor shaft and its brake drum 36 to be clockwise in Fig. 3, and as the indicator 24 reached +15 graduation 78, the pin 60 will engage the surface of the recess 76 in the yoke 61, and the brake yoke is slightly rotated on the final gear shaft so that the brake shoe 80 will be urged to engage the rotating brake drum 36. The instant the drum and brake shoe engage each other, there is a gripping between the respective surfaces thereof and the brake shoe 80 is urged against the brake shoe limit pin 72, and the motor shaft is halted instantly by the wedging action of the brake shoe notwithstanding the fact that the motor is still electrically energized. When the reversible motor 30 is energized so as to rotate its rotor shaft 34 in the opposite direction, even a very slight amount, causing a very slight angular displacement of the brake drum, the brake shoe 80 is released and immediately becomes spaced from the drum, and the tension spring 65 holds the yoke 61 centralized, thereby permitting the motor to operate freely in the opposite direction.

While only one actuating pin, such as 60, is shown, the invention has many applications in other systems where the dial range is different, and consequently more than one actuating pin may be required.

While a pointer is used as an output of the system, the final gear output may also be used to drive a computer or other device where precision stopping of a drive motor is utilized to limit the extent of operation of an output of the system.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. In a servo system having a motor with a shaft and a brake drum thereon, said shaft having a gear to drive a gear train for operating an output means, and a braking means cooperating with said brake drum; the combination comprising means actuable by said output means to operate said braking means for stopping said motor, said braking means including a brake yoke, resilient means to normally hold said brake yoke in predetermined alignment with the shaft of said motor, and brake shoe means on said brake yoke positioned to engage said brake drum to prevent operation of said motor shaft when said output means reaches a predetermined position; said means actuable by said output means for stopping said motor including a final gear on a gear shaft and an actuating pin carried by said final gear and angularly displaceable for engaging the brake yoke; a pointer disposed on said gear shaft, a dial having indicia thereon with certain of said indicia indicating optimum range limits, said pointer angularly displaceable in cooperative relation with the indicia of said dial, and the angular displacement of said pointer within said range limits being equal to and controlled by the total angular displacement of said actuating pin.

2. In a servo system having a motor with a shaft to drive a gear train for operating an output means, a brake drum on said shaft, and braking means cooperating with said brake drum; the improvement comprising a member angularly displaceable by said output means to operate said braking means for stopping said motor, said braking means including a brake yoke, resilient means to normally hold said brake yoke in predetermined alignment with the shaft of said motor, and brake shoe means on said yoke to engage said brake drum and prevent operation of said gear train when said output means reaches a predetermined position, and said brake shoe means being normally spaced from said brake drum; a pointer actuable by said output means, a dial having indicia thereon with certain of said indicia indicating optimum range limits, said pointer angularly displaceable relative to said dial and in cooperative relation with the indicia thereon, and the angular displacement of said pointer within said range limits being equal to and controlled by the total angular displacement of the member to operate said braking means.

3. In a servo system having a motor with a shaft to drive a gear train for operating an output means, a brake drum on said shaft, and braking means cooperating with said brake drum; the improvement comprising a member angularly displaceable by said output means to operate said braking means for stopping said motor, a pointer actuable by said output means, a dial having indicia thereon with certain of said indicia indicating optimum range limits, said pointer angularly displaceable relative to said dial and in cooperative relation with the indicia thereon, and the angular displacement of said pointer within said range limits being equal to and controlled by the total angular displacement of the member to operate said braking means.

References Cited in the file of this patent

UNITED STATES PATENTS

| | | |
|---|---|---|
| 2,393,189 | Richmond | Jan. 15, 1946 |
| 2,528,733 | Brass | Nov. 7, 1950 |
| 2,547,475 | Larsen | Apr. 3, 1951 |
| 2,727,613 | Radkowski | Dec. 20, 1955 |